United States Patent
de Place Rimmen

(10) Patent No.: US 7,955,045 B2
(45) Date of Patent: Jun. 7, 2011

(54) METHOD FOR PROLONGING AND/OR CONTROLLING THE LIFE OF ONE OR MORE HEAT GENERATING AND/OR PASSIVE COMPONENTS IN A WIND TURBINE, A WIND TURBINE, AND USE THEREOF

(75) Inventor: Peter de Place Rimmen, Hammel (DK)

(73) Assignee: Vestas Wind Systems A/S (DK)

( * ) Notice: Subject to any disclaimer, the term of this patent is extended or adjusted under 35 U.S.C. 154(b) by 199 days.

(21) Appl. No.: 12/112,987

(22) Filed: Apr. 30, 2008

(65) Prior Publication Data

US 2008/0298964 A1 Dec. 4, 2008

Related U.S. Application Data

(63) Continuation of application No. PCT/DK2005/000698, filed on Nov. 1, 2005.

(51) Int. Cl.
*F01D 21/12* (2006.01)
(52) U.S. Cl. .............................. 415/1; 415/47
(58) Field of Classification Search ............... 415/1, 47, 415/119, 175, 178, 176, 60, 61, 116; 416/198 R
See application file for complete search history.

(56) References Cited

U.S. PATENT DOCUMENTS

| | | | | |
|---|---|---|---|---|
| 5,142,860 A | * | 9/1992 | Strange et al. | 60/39.281 |
| 5,732,546 A | * | 3/1998 | Pineo et al. | 60/773 |
| 6,212,871 B1 | * | 4/2001 | Rakhmailov | 60/773 |
| 6,230,479 B1 | * | 5/2001 | Kawamura et al. | 60/773 |
| 6,676,122 B1 | * | 1/2004 | Wobben | 290/55 |
| 2004/0200207 A1 | * | 10/2004 | McKelvey et al. | 60/39.281 |

FOREIGN PATENT DOCUMENTS

| | | |
|---|---|---|
| DE | 19624171 C1 | 1/1998 |
| WO | 2004085816 A1 | 10/2004 |

OTHER PUBLICATIONS

International Search Report, Jun. 28, 2006, 3 pages.

* cited by examiner

*Primary Examiner* — Edward Look
*Assistant Examiner* — Aaron R Eastman
(74) *Attorney, Agent, or Firm* — St. Onge Steward Johnston & Reens LLC

(57) ABSTRACT

The invention relates to a method for prolonging and controlling the life of components associated with a wind turbine, by controlling the cooling down procedure of the components. Gradually lowering the temperature of the components reduces the number of temperature fluctuations of the component, thus extending the life of the components.

33 Claims, 5 Drawing Sheets

METHOD FOR PROLONGING AND/OR CONTROLLING THE LIFE OF ONE OR MORE HEAT GENERATING AND/OR PASSIVE COMPONENTS IN A WIND TURBINE, A WIND TURBINE, AND USE THEREOF

CROSS-REFERENCE TO RELATED APPLICATIONS

The present application is a continuation of pending International patent application PCT/DK2005/000698 filed on Nov. 1, 2005, which designates the United States and the content of which is incorporated herein by reference.

FIELD OF THE INVENTION

The invention relates to a method for prolonging and/or controlling the life of one or more heat generating and/or passive components in a wind turbine, a wind turbine, and use hereof.

BACKGROUND OF THE INVENTION

A wind turbine known in the art comprises a wind turbine tower and a wind turbine nacelle positioned on top of the tower. A wind turbine rotor with three wind turbine blades is connected to the nacelle through a low speed shaft, which extends out of the nacelle front as illustrated on FIG. 1.

Thermal stress to components containing or comprising materials of different temperature expand coefficients is a well know problem, and within the art of making wind turbines this problem is particularly pronounced.

Thermal stress basically originates from two factors—High temperature and more importantly varying temperatures.

Arrhenius' exponential "law", which is a well proven theory, suggest that the higher the temperature, the faster a given chemical reaction will proceed and e.g. regarding electrical components, a rule of thumb says that for every 10° C. the temperature is raised, the risk of failures doubles. So to ensure long life of the wind turbines heat generating and/or passive components such as power converters, generators, control systems, gears and hydraulic systems it is known to provide these components with some sort of temperature control, often in form of cooling systems keeping the components operating temperature below a certain level.

The problem with this solution is, that the ambient temperature varies a lot from site to site, from day to night and from season to season. This combined with the variation in internal heat production, due to varying wind conditions and thereby varying power production, makes the components temperature vary a lot both during the day and night and during the year. Furthermore it is very difficult to estimate the life of the components if there is no or very little control with the size and number of temperature fluctuations.

Varying temperatures in heat generating and/or passive components is a big problem, mainly because of the fact that different materials have different coefficients of thermal expansion, but also because e.g. lubricants and interacting mechanical components are made to work optimally at a specific temperature.

The solution to this problem would be to maintain the components temperature fixed at all times. But this would demand a cooling and heating system with a very high capacity, which would be expensive in both manufacturing, operating and maintenance costs. Furthermore such a system or systems would be both big and heavy which is particularly disadvantageous in the art of making wind turbines.

An object of the invention is therefore to provide a temperature control system for heat generating and/or passive components in or at a wind turbine without the mentioned disadvantages.

Furthermore it is an object of the invention to provide for a cost efficient temperature control system that reduces the thermal stress in the heat generating and/or passive components of a wind turbine.

Especially it is an object of the invention to provide for a cost efficient temperature control system that controls the thermal stress in the heat generating and/or passive components of a wind turbine.

SUMMARY OF THE INVENTION

The invention provides for a method for prolonging and/or controlling the life of one or more heat generating and/or passive components in a wind turbine, by controlling the cooling down procedure of said one or more heat generating and/or passive components, by controlling the temperature of said one or more heat generating and/or passive components.

If the wind turbine was equipped with a temperature control system with a cooling capacity, making it able to control the temperature of the heat generating and/or passive components when their temperature rises, the temperature of the components would not be rising in the first place. But such a temperature control system would be big, heavy and expensive. However when the cooling capacity exceeds the overall heat output, the temperature of the components will start to drop and this process can be controlled by a wind turbine temperature control system of the same size and capacity as an ordinary temperature control system. Even though this control of the components temperature most often will maintain the components temperature at level higher that necessary during the cooling down process (which potentially reduces the components life), it is still advantageous in that, the number of temperature fluctuations is reduced in a way which most often will prolong the total life of the heat generating and/or passive components. And possibly more important, this makes it possible, within a reasonable margin of error, to predict the number of fluctuations and thereby predict the life of the heat generating and/or passive components. This is advantageous in that, it makes it profitable or at least more profitable to replace certain components at certain intervals e.g. in connection with ordinary maintenance of the wind turbine.

It should be emphasised that by the term "heat generating . . . components" is to be understood components, which produce heat e.g. because they conduct electrical power, because they are in motion or other. This could e.g. be an electrically active motherboard, an entire electrically active power converter or a rotating bearing. By the term " . . . passive components" is to be understood components which does not produce heat themselves, but they could still be under the influence of e.g. the radiation of heat from neighbouring heat generating components and the ambient temperature in general. This could e.g. be a motherboard which is turned off, meaning it does not conduct any electrical power, it could be stagnant oil in the oil sump of a gear or a hydraulic system or another component which temporarily or permanently does not generate heat.

Further, it should be emphasised that the heat generating and/or passive components do not necessarily have to be located inside the wind turbine e.g. in the tower or in the nacelle. They could also be located in a cabinet, a shed or a house outside the wind turbine.

An aspect of the invention provides for a method which comprises the steps of, monitoring the temperature of said one or more of said heat generating and/or passive components, detecting peaks in said one or more heat generating and/or passive components temperature, and controlling the temperature of said one or more heat generating and/or passive components by means of one or more temperature control systems including heating and cooling means, in relation to the latest temperature peak.

It is advantageous to control the temperature of the heat generating and/or passive components based on the latest temperature peak, in that it ensures efficient use of the temperature control systems, it enables the possibility of controlling the number of temperature fluctuations and at the same time it enables the possibility of reducing the thermal stress on the components.

It should be emphasised that in this context the term "peak" is to be understood as the point where the temperature shifts from rising to declining.

An aspect of the invention provides for a method wherein said temperature of said one or more heat generating and/or passive components, is controlled according to a predefined reference curve.

By lowering the temperature of the heat generating and/or passive components according to a predefined reference curve it is possible to lower the temperature in many different more or less complex ways. This is advantageous in that different kinds of wind turbines placed in different environments might need different lowering curves of the temperature e.g. very fast in the beginning and gradually slower or other. This would be useful in attempting to control and reduce the thermal stress in the heat generating and/or passive components.

Furthermore it is advantageous to control the components temperature according to a predefined reference curve, in that it enables the possibility of controlling the life of the components. The components life is among other things depending on the number of temperature fluctuations it is exposed to during its life. If e.g. the cooling curve declines fast it will potentially lead to more temperature fluctuations than if it declines slowly, whereby shortening the components life.

An aspect of the invention provides for a method wherein said temperature of said one or more heat generating and/or passive components (8), is controlled according to a linear or substantially linear reference curve.

It is advantageous to lower the temperature according to a linear reference curve in that it provides for relatively little thermal stress on the heat generating and/or passive components.

An aspect of the invention provides for a method wherein said temperature of said one or more heat generating and/or passive components, is controlled by lowering said temperature of said one or more of said heat generating and/or passive components in steps.

It is advantageous to lower the temperature of the heat generating and/or passive components in steps in that it provides for a relatively simple feedback control of the temperature.

An aspect of the invention provides for a method wherein said temperature of said one or more heat generating and/or passive components, is controlled by lowering said temperature of said one or more heat generating and/or passive components until a predefined lowest operational temperature is reached.

It is advantageous to lower the temperature of the heat generating and/or passive components until a predefined lowest operational temperature is reached that, the lower the operational temperature is, the lower the thermal stress is, but only to a certain level where the components could be damaged by too low temperatures e.g. because of rising viscosity of lubricants, shrinkage of mechanically interacting parts and so on.

An aspect of the invention provides for a method wherein said temperature of said one or more heat generating and/or passive components, is controlled by lowering said temperature until said temperature rises and a new temperature peak occurs.

It is advantageous to lower the temperature of the heat generating and/or passive components until the temperature rises again and a new temperature peak occurs in that, it provides for a relatively simple closed loop control of the heat generating and/or passive components. Furthermore it is advantageous use of the temperature control system to lower the temperature until the heat produced by the heat generating and/or passive components exceeds the systems cooling capacity and at the same time reducing the thermal stress on the heat generating and/or passive components.

An aspect of the invention provides for a method wherein said temperature of said one or more heat generating and/or passive components, is controlled by lowering said temperature of said one or more heat generating and/or passive components averagely 1° C. between every 10 minutes to 1440 minutes, preferably 60 minutes to 720 minutes and most preferred 180 minutes to 540 minutes.

The present ranges provides for an advantageous relation between the thermal stress produced by high temperatures and varying temperatures.

An aspect of the invention provides for a method wherein said temperature of said one or more heat generating and/or passive components, is controlled by controlling the temperature of the air in and/or surrounding one or more of said heat generating and/or passive components and/or controlling the temperature of a fluid as a means for internal temperature control of one or more of said heat generating and/or passive components.

It is advantageous to control the temperature of the air surrounding the components or the air inside the components, in that it is a simple and cost efficient way of controlling the temperature of some heat generating and/or passive components. But air does not have a very high thermal conductivity, so if a component such as a power resistor produces much heat, it is advantageous to establish a refrigerant flow through or around the component.

An aspect of the invention provides for a method wherein said temperature of said one or more heat generating and/or passive components, is controlled by means at least one refrigerant such as substantially frost-proof water, brine, ammoniac, $CO_2$ and/or Freon gases.

Using a refrigerant is a simple, cost efficient and well proven way of transporting heat in a temperature control system.

An aspect of the invention provides for a method wherein said heating and cooling means comprise means for heating or cooling said refrigerant.

Heating or cooling the refrigerant by means of the heating and cooling means is a simple and well proven way of controlling the temperature in a temperature control system.

An aspect of the invention provides for a method wherein said heat generating and/or passive components are power handling equipment and/or mechanical components such as power converters, generators, switches, inverters, resistors, hydraulic systems, gears, transformers and control systems.

It is advantageous to reduce and control the thermal stress on the power handling equipment and/or mechanical components, in that they are essential components of the wind turbine, which can be very expensive and/or difficult to exchange, and it can be very difficult to estimate their life, if the thermal stress is not controlled.

An aspect of the invention provides for a method wherein said method further includes the step of lowering said temperature of said one or more of said heat generating and/or passive components controlled from said peak temperature.

It is advantageous to lower the temperature of said one or more heat generating and/or passive components controlled, in that it enables the possibility of controlling the size and the number of temperature fluctuations in the heat generating and/or passive components. This is advantageous, in that it enables the possibility of predicting the life of the heat generating and/or passive components within a narrow margin of error.

An aspect of the invention provides for a method wherein said method further includes the step of positioning said means for controlling the temperature of the air in and/or surrounding one or more of said heat generating and/or passive components inside said heat generating and/or passive components.

It is advantageous to place the means for controlling the temperature of the air in and/or surrounding the heat generating and/or passive components inside the heat generating and/or passive components, in that it enables the possibility of cooling/heating the air by circulating the air inside the component through the means for controlling the temperature of the air. Hereby air-exchange with the surroundings can be avoided, which is advantageous, in that the outside air can have varying humidity, it can contain bugs or other things potentially harmful for the component.

An aspect of the invention provides for a method wherein said method further includes the step of controlling the temperature of said means for controlling the temperature, of the air in and/or surrounding one or more of said heat generating and/or passive components, by means of said refrigerant.

Using the refrigerant to control the temperature of the air in or around the components is advantageous, in that it enables the possibility of using the same refrigerant to control the temperature of the air and to flow through the fluid cooled/heated components. This is advantageous in that it ensures a relatively low and constant temperature difference between the air surrounding a component and the refrigerant flowing through the component, hereby reducing the thermal stress on the component.

An aspect of the invention provides for a method wherein said temperature of said one or more heat generating and/or passive components, is controlled by varying the output of said heating and cooling means.

It is advantageous to control the temperature of the heat generating and/or passive components by varying the output of the heating and cooling means of the temperature control system in that, it is a relatively simple way of controlling the temperatures.

An aspect of the invention provides for a method wherein said temperature of said one or more heat generating and/or passive components, is controlled by turning said heating and cooling means on and off.

It is advantageous to control the temperature of the heat generating and/or passive components by turning said heating and cooling means on and off, in that it is a simple and cost efficient way of controlling the temperature.

The invention further provides for a wind turbine comprising means for prolonging and/or controlling the life of one or more heat generating and/or passive components, by controlling the cooling down procedure of said one or more heat generating and/or passive components, by controlling the temperature of said one or more heat generating and/or passive components.

Controlling the cooling down procedure of the heat generating and/or passive components in a wind turbine is advantageous, in that it enables the possibility of reducing the number of temperature fluctuations and calculating, predicting or estimating the number of temperature fluctuations rather accurately, whereby making it possible to prolong and control the life of the heat generating and/or passive components in a wind turbine.

An aspect of the invention provides for a wind turbine, wherein said means comprise, one or more temperature control systems including heating and cooling means, means for monitoring the temperature of one or more of said heat generating and/or passive components, means for detecting peaks in said one or more heat generating and/or passive components temperature, and means for controlling the temperature of said one or more heat generating and/or passive components by means of said one or more temperature control systems in relation to the latest temperature peak.

It is advantageous to control the temperature of the heat generating and/or passive components of a wind turbine in relation to the latest temperature peak in that it enables the possibility controlling the temperature of the heat generating and/or passive components in a way that reduces the thermal stress on the components.

An aspect of the invention provides for a wind turbine, wherein said means lowers the temperature of said one or more heat generating and/or passive components, according to a predefined reference curve.

An aspect of the invention provides for a wind turbine, wherein said predefined reference curve provides for substantially linearly lowering of said temperature.

An aspect of the invention provides for a wind turbine, wherein said predefined reference curve provides for lowering of said temperature in steps.

An aspect of the invention provides for a wind turbine, wherein said means lowers the temperature of said one or more heat generating and/or passive components until a predefined lowest operational temperature is reached or until said temperature rises and a new temperature peak occurs.

An aspect of the invention provides for a wind turbine, wherein said means lowers the temperature of said one or more heat generating and/or passive components averagely 1° C. between every 10 minutes to 1440 minutes, preferably 60 minutes to 720 minutes and most preferred 180 minutes to 540 minutes.

An aspect of the invention provides for a wind turbine, wherein said means further comprise at least one refrigerant such as substantially frost-proof water, brine, ammoniac, $CO_2$ and/or Freon gases.

An aspect of the invention provides for a wind turbine, wherein said heating and cooling means comprise means for heating or cooling said refrigerant.

An aspect of the invention provides for a wind turbine, wherein said heat generating and/or passive components are power handling equipment and/or mechanical components such as power converters, generators, switches, inverters, resistors, hydraulic systems, gears, transformers and control systems.

An aspect of the invention provides for a wind turbine, wherein said means lowers the temperature of said one or more heat generating and/or passive components controlled from said peak temperature.

An aspect of the invention provides for a wind turbine, wherein means controls the temperature of said one or more heat generating and/or passive components by varying the output of said heating and cooling means.

An aspect of the invention provides for a wind turbine, wherein said means controls the temperature of said one or more heat generating and/or passive components by turning said heating and cooling means on and off.

An aspect of the invention provides for a wind turbine, wherein said means comprise means for controlling the temperature of the air in and/or surrounding one or more of said heat generating and/or passive components and/or fluid means for internal temperature control of one or more of said heat generating and/or passive components.

An aspect of the invention provides for a wind turbine, wherein said means for controlling the temperature of the air in and/or surrounding one or more of said heat generating and/or passive components are positioned inside said heat generating and/or passive components.

An aspect of the invention provides for a wind turbine, wherein said means controls the temperature of said means for controlling the temperature, of the air in and/or surrounding one or more of said heat generating and/or passive components, by means of said refrigerant.

The invention further provides for a wind turbine according to any of claims 18 to 33, wherein said wind turbine is a variable speed pitch controlled wind turbine.

Even further the invention provides for use of wind turbine according to any of claims 18 to 33 in combination with a method according to any of claims 1 to 17.

BRIEF DESCRIPTION OF THE DRAWINGS

The invention will be described in the following with reference to the figures in which.

DETAILED DESCRIPTION OF THE INVENTION

Figure 1:
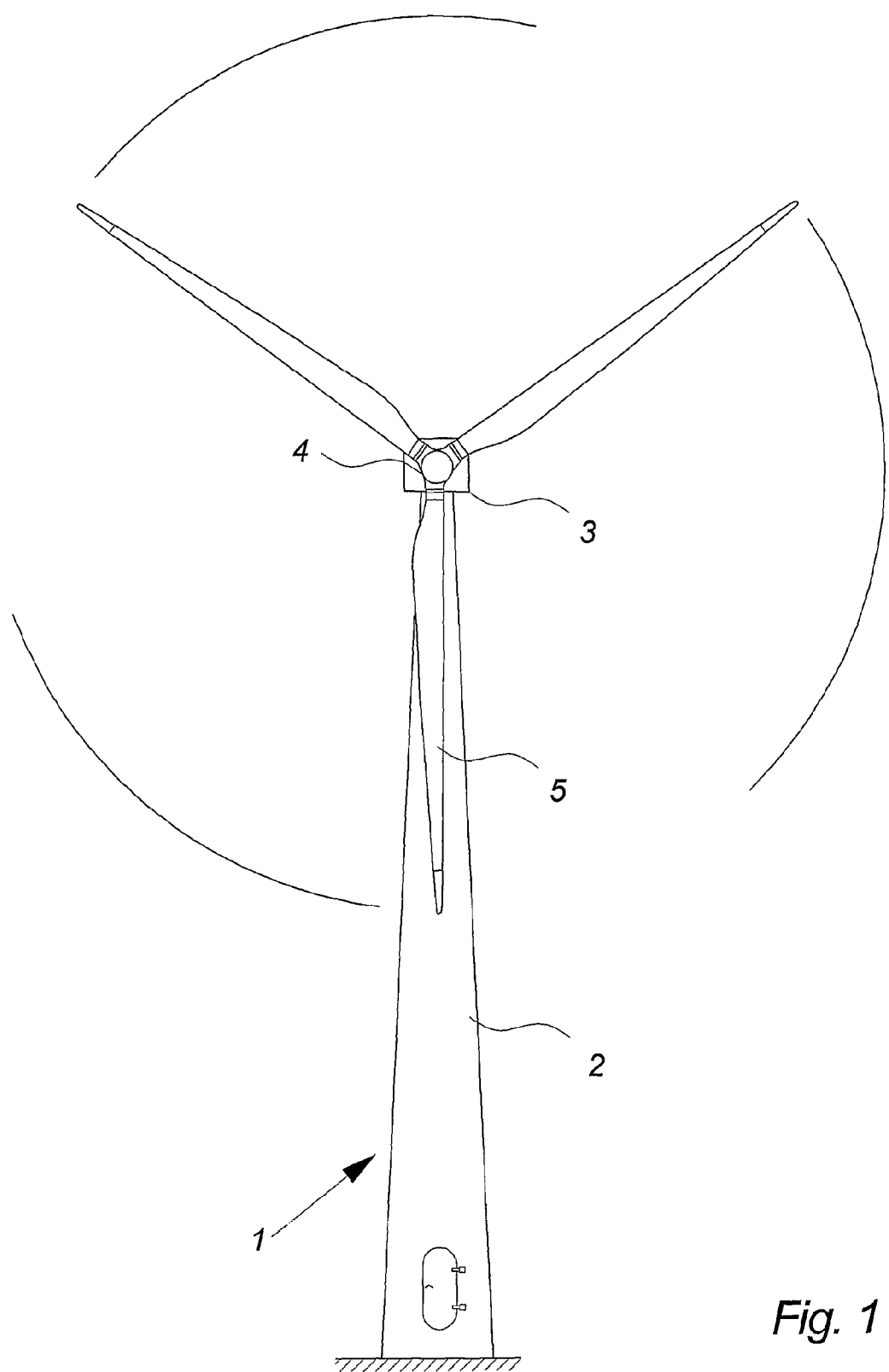
FIG. 1. illustrates a large wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft (Not Shown) which extends out of the nacelle 3 front.

Figure 2:
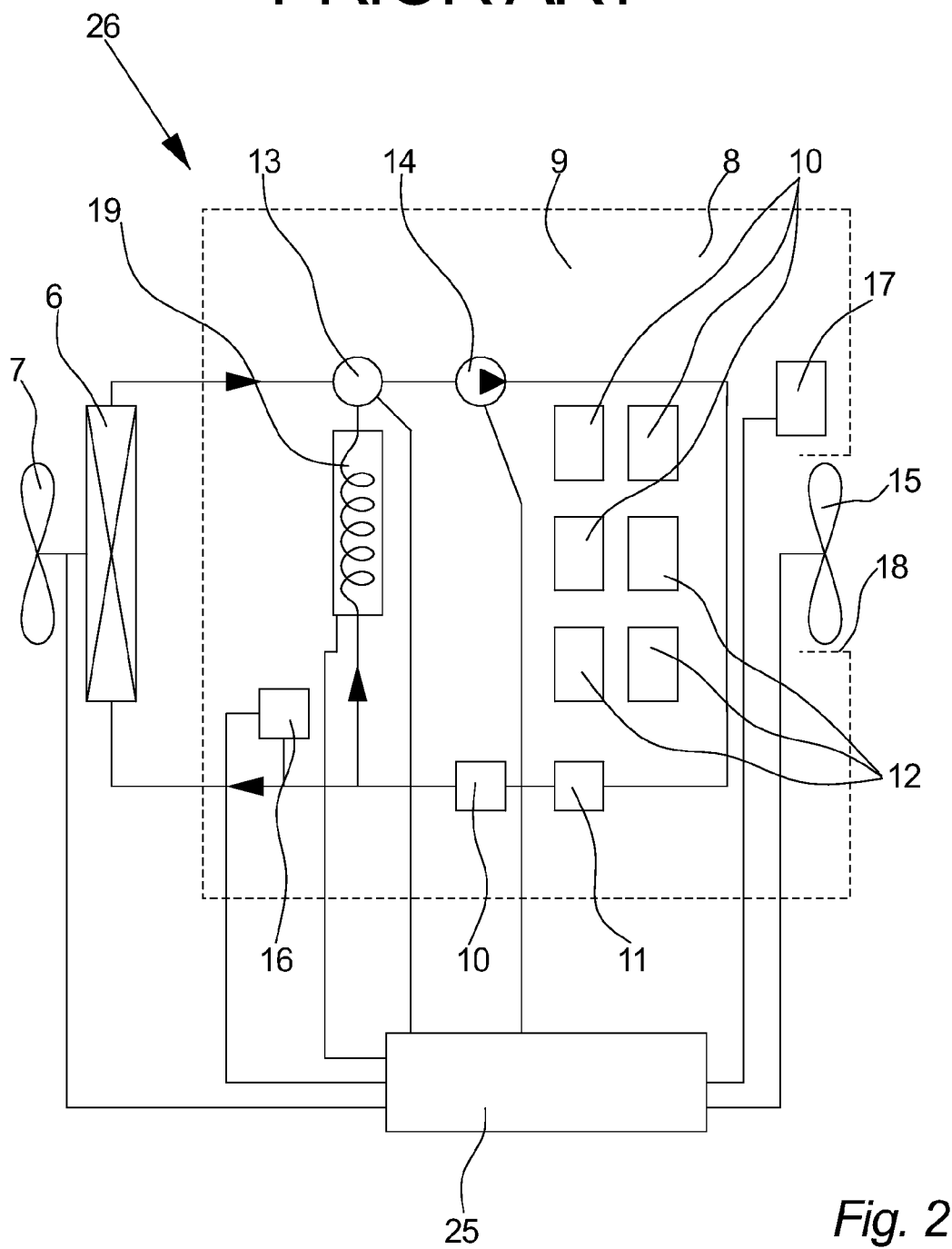
FIG. 2 illustrates an embodiment of a traditional temperature control system for heat generating and/or passive components in a wind turbine.

FIG. 2 illustrates an embodiment of a traditional temperature control system 26 for controlling the temperature of heat generating and/or passive components 8 in a wind turbine 1.

In this embodiment the illustrated heat generating and/or passive component 8 could be a power converter 9 comprising different kind of power handling equipment 10 such as power resistors 11, motherboards 12 and other. In this embodiment the motherboards 12 is air cooled, and the power resistors 11 is both air and fluid cooled.

A main radiator 6 with a fan 7 is mounted outside the power converter 9 properly in a location enabling free air inlet from the outside of the wind turbine 1. From the main radiator 6 a refrigerant flows through a bidirectional valve 13 and through a pump 14 which creates the flow of the refrigerant. From the pump 14 the refrigerant flows through the equipment 11 in the power converter 9 which demands fluid cooling. The possibly heated refrigerant then returns to the main radiator 6 to be cooled again.

On the way out of the power converter 9 the refrigerants temperature is measured by a refrigerant thermometer 16 and this temperature is compared with predefined maximum and minimum reference temperatures in a controller 25. If the refrigerants temperature is above the maximum reference temperature the controller 25 starts the fan 7 on the main radiator 6. When the refrigerants temperature drops below the minimum reference temperature, the controller 25 stops the fan 7 again.

The power converter 9 also contains equipment 12 which only can or needs to be air cooled. The cabinet surrounding the power converter 9 is therefore provided with at least one cabinet fan 15 driven air inlets 18. An air thermometer 17 can measure the air temperature and compare it to maximum and minimum reference temperatures in the controller 25. If the air temperature is below the minimum reference temperature the cabinet fan 15 stops. When the air temperature inside the cabinet rises above the maximum reference temperature, the fan 15 starts again.

If the wind turbine 1 is placed in a cold environment and the weather is calm making the power production, and thereby most of the internal heat emission, stop, it can be necessary to heat the power handling equipment 10 in the power converter 9. This can be done by activating the bidirectional valve 13 changing the direction of the refrigerant flow and making it circulate inside the power converter 9 and pass a refrigerant heater 19.

If the ambient temperature is high and the weather is windy, the equipment in the wind turbine 1 could produce so much heat, that the temperature rises above a certain level which makes some of the equipment shut down to protect them from being damaged by the high temperature. This will make most or the entire power production stop, and thereby also stop most of the internal heat production.

Figure 3:
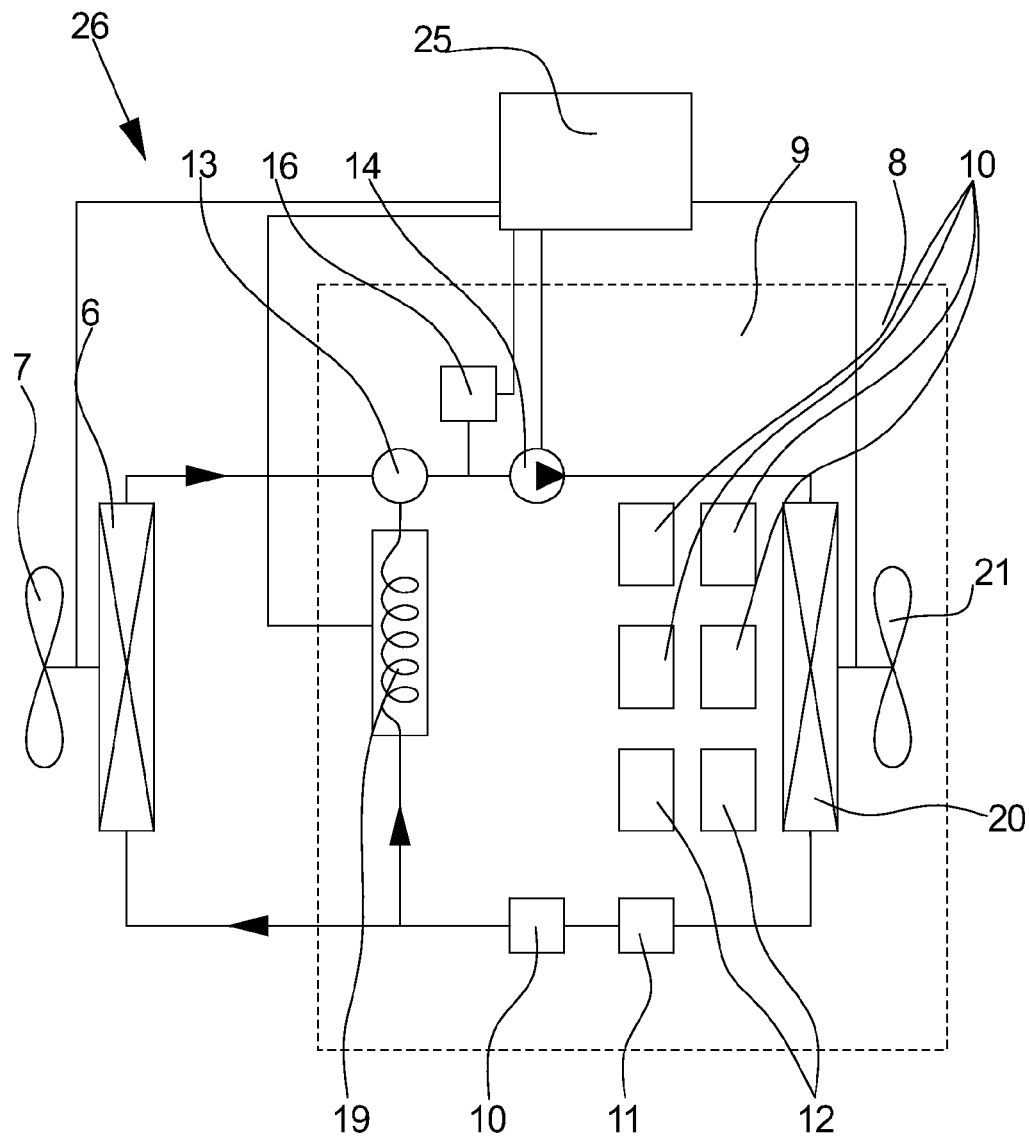
FIG. 3 illustrates an embodiment of a temperature control system for heat generating and/or passive components in a wind turbine according to the invention.

FIG. 3 illustrates an embodiment of a temperature control system 26 for heat generating and/or passive components 8 in a wind turbine 1 according to the invention.

In this embodiment the illustrated heat generating and/or passive component 8 could, as also illustrated in FIG. 2, be a power converter 9 comprising different kind of power handling equipment 10. Some of the equipment 10 is air cooled, and some is both air and fluid cooled.

Like in the traditional systems a main radiator 6 with a fan 7 is mounted outside the power converter 9 ensuring proper heat-exchange with the surroundings. From the main radiator 6 the refrigerant flows through a bidirectional valve 13 and through a pump 14 which creates the flow of the refrigerant. From the pump 14 the refrigerant flows through an internal radiator 20 provided with an internal fan 21. The radiator 20 and the fan 21 blows cooled air on and past the components that needs air cooling such as the motherboards 12 or it ensures a flow of air inside the cabinet.

From the radiator 20 the refrigerant flows through the equipment 11 in the power converter 9 which demands fluid cooling. The possibly heated refrigerant then returns to the main radiator 6 to be cooled again.

Somewhere inside the power converter 9, properly between the bidirectional valve 13 and the pump 14 the temperature of the refrigerants is measured by a refrigerant thermometer 16. The temperature control system 26 is provided with a controller 25 which attempts to keep the system temperature on a constant level by maintaining the temperature of the refrigerant constant. This is mainly done by starting and stopping the main radiator fan 7, but it could also be done by varying the rotation speed of the fan 7, by varying the speed of the pump 14 or even by starting and stopping the pump 14. The temperature can of course not be kept absolutely constant because of the systems inertia, but the fluctuation of the temperature can be kept as little as possible, such as +/−0.3° C.

After a preset time, such as 6 hours, the controller 25 lowers the system temperature by e.g. 1° C., or the controller 25 could lower the temperature e.g. 1° C. over e.g. 6 hours making the temperature drop linearly. This gradual lowering of the temperature is continued until one of two things happens. The most common scenario is that the temperature is lowered until the systems heat output exceeds the temperature control systems 26 cooling capacity, making the refrigerant and thereby the component 8 temperature rise and reach a new peak level, from where the temperature is gradually lowered again. This relatively slow lowering of the temperature will then continue until the heat output exceeds the temperature control systems cooling capacity again, which creates a new temperature peak and a new controlled lowering starts.

If the wind turbine is sited in a cold environment and the weather is calm making the power production stop, the controller could gradually lower the temperature until a preset lowest operating temperature, e.g. 0° C., is reached. The temperature would then be maintained constant on this level until the first scenario happens.

According to the invention the air temperature in the cabinet could be controlled in the same way as in traditional temperature control systems 26, as explained under FIG. 2, but in this embodiment of the invention, the power converter 9 is provided with an internal radiator 20 and fan 21 which functions as means for controlling the temperature of the equipment 12 in the power converter 9 which only can or needs to be air cooled. This means that the air temperature is controlled by the same refrigerant that are used for fluid cooling of some of the equipment 12 in the power converter 9, which makes the temperature difference between the refrigerant and the air surrounding the equipment 12 small and relatively constant.

If the wind turbine 1 is placed in a cold environment and the weather temporarily is calm, the system can keep the equipment on a lowest operating temperature by heating the power handling equipment 10 in the power converter 9. Like in traditional systems this can be done by activating the bidirectional valve 13 changing the direction of the refrigerant flow and making it circulate inside the power converter 9 and passes a refrigerant heater 19.

It should be understood, that the order of the components in the system is not in any way limited to the illustrated order. In another embodiment of the invention the components of the temperature control system could be placed differently e.g. the refrigerant thermometer 16, the pump 14 and other could be placed after the refrigerant cooled equipment. Likewise, the number of the different component can vary within the scope of the invention, and some of the components such as pumps 14, refrigerant heaters 19, bidirectional valves 13 and other could be placed outside the power converter 9 or the other heat generating and/or passive components 8 of the wind turbine 1, in which the temperature control system according to the invention is applied. Different heat generating and/or passive components 8 of the wind turbine 1 could also share different components of the temperature control system e.g. one main radiator 6 could be attached to different or the same temperature control systems 26 in different heat generating and/or passive components 8 or a single controller 25 could control all the temperature control systems 26 in or at the wind turbine 1.

Figure 4:
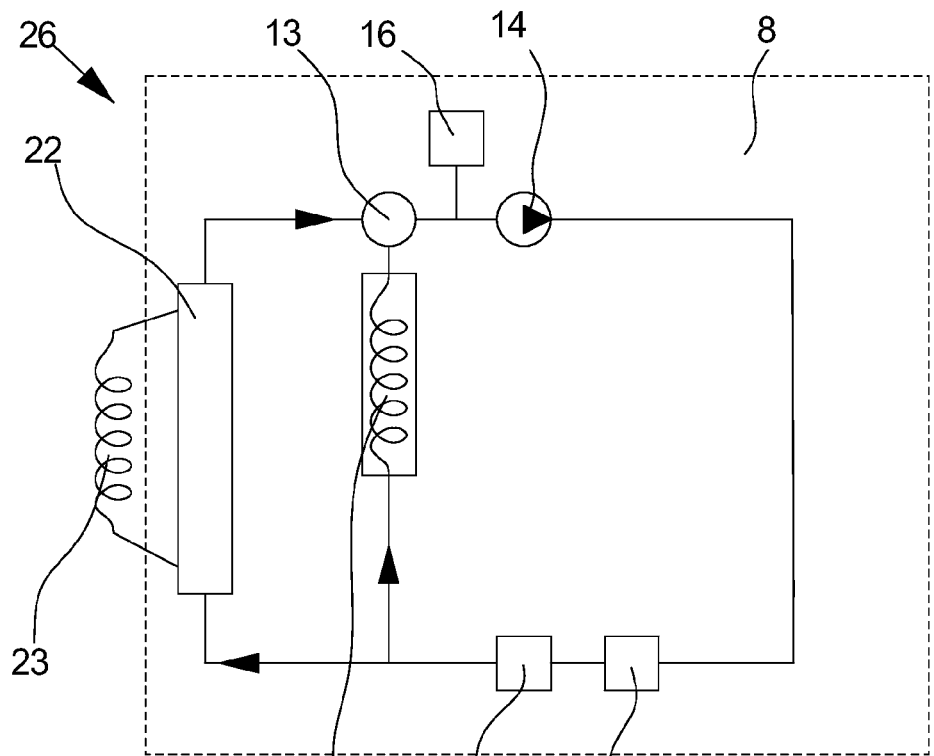
FIG. 4 illustrates another embodiment of a temperature control system for heat generating and/or passive components in a wind turbine according to the invention.

FIG. 4 illustrates an embodiment of a temperature control system 26 for e.g. a gear, a hydraulic system or other heat generating and/or passive components 8 of a wind turbine 1.

In this embodiment of the invention the heat generating and/or passive component 8 is equipped with an active cooling device 22 comprising a compressor. The active cooling device 22 could be of the type generally known from refrigerators and freezers. The cooling pipes 23 of the active cooling device 22 are placed outside the heat generating and/or passive component 8 and possibly even outside the wind turbine 1.

In this embodiment of the invention the heat generating and/or passive component 8 contains no equipment that needs air cooling. The refrigerant flows from the active cooling device 22 through a bidirectional valve 13, a pump 14 and through the parts of the heat generating and/or passive component that need cooling or heating. If the refrigerant flows through e.g. the oil sump of a gear or a hydraulic system the thermometer 16 could be placed on the respective oil flow system making the system 26 control the temperature based on the gears or the hydraulic systems oil temperature. In another embodiment of the invention the previously described refrigerant could be the oil of e.g. a gear or a hydraulic system.

From the equipment to which the refrigerant flows, the heated or cooled refrigerant returns to the active cooling device 22 or to the refrigerant heater 19.

The temperature control system 26 is controlled by a controller 25 which is not shown in this figure.

Figure 5:
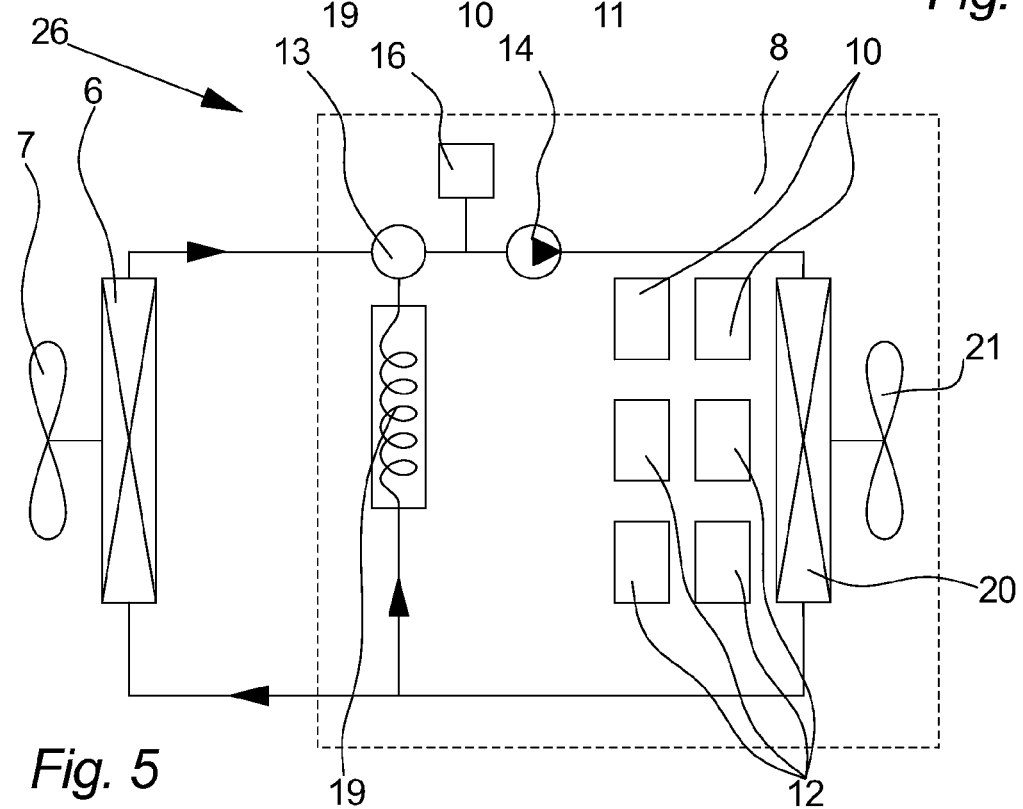
FIG. 5 illustrates third embodiment of a temperature control system for heat generating and/or passive components in a wind turbine according to the invention.

FIG. 5 illustrates an embodiment of the invention where only air cooling is needed. The heat generating and/or passive component could in this embodiment be a cabinet comprising controllers or other power handling equipment.

The refrigerant flows through an internal radiator 20 which cools or heats the air. To control the air temperature a controller (not shown) could start and stop both the main fan 7 and the internal fan 21 or it could vary the speed of the fans or the pump 14.

Figure 6:
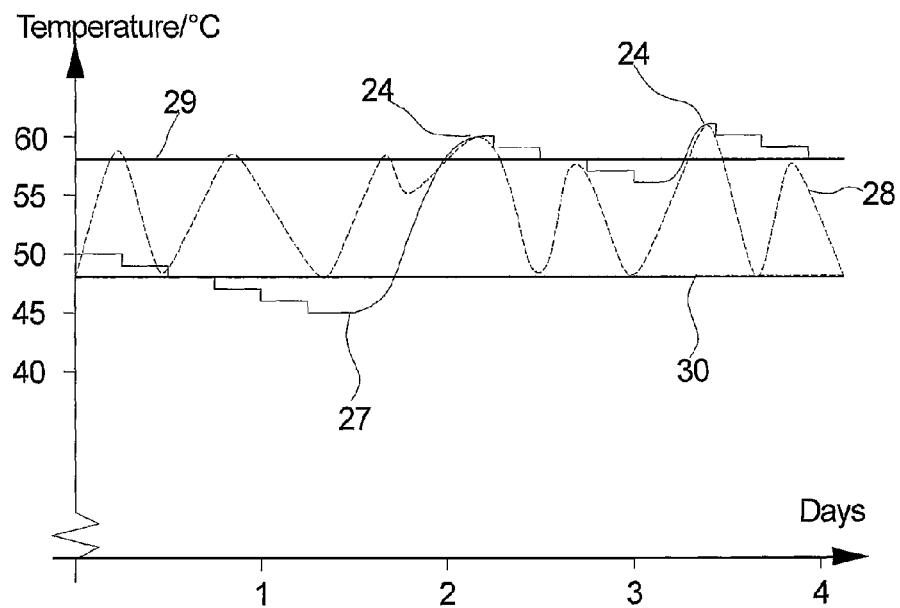
FIG. 6 illustrates an embodiment of two curves illustrating a heat generating and/or passive components temperature as seen over four days.

FIG. 6 illustrates an embodiment of a heat generating and/or passive components 8 temperature curve 28 in a traditional temperature control system 26, and temperature curve 28 in a system according to the invention as seen over four days.

The solid curve 27 illustrates, that from the start of day one the temperature of the heat generating and/or passive component 8 (as seen on the vertical axis) is lowered 1° C. each six hours. This gradual lowering of the temperature goes on for one and a half days, until the ambient temperature and the internal heat production get so high that it exceeds the capacity of the cooling system. This makes the temperature of the heat generating and/or passive component rise until it reaches a peak 24 from where the temperature again is lowered 1° C.

each six hours. This lowering then continues for about a day when a new peak 24 occurs which starts a new gradual lowering of the temperature.

The curve shown in dotted line 28 illustrates a possible temperature curve 28 for a heat generating and/or passive component 8 in a traditional temperature control system 26. Most often in traditional temperature control systems 26 the temperature will rise until an upper temperature level 29 is reached. This triggers a cooling process, which makes the temperature of the heat generating and/or passive component 8 drop, until a lower temperature level 30 is reached, where the cooling process stops, and the temperature of the heat generating and/or passive component 8 starts to rise again.

The curves 27, 28 also indicates that the number of temperature fluctuations in a traditional temperature control system 26 is far greater, that in a system 26 according to the invention.

How often the temperature is lowered and how much it is lowered each time, could be preset in a controller 25 in a temperature control system 26 according to the invention. It could be as values (e.g. 2° C. every 10 hours) or it could be as a predefined reference curve allowing for more complex lowering of the temperature (e.g. linearly or faster just after a peak 24 and then gradually slower or other). In another embodiment of the invention this controller 25 could operate with different temperature steps or different intervals for different times of the day, different times of the year, different ambient temperatures or other.

By lowering the temperature bit by bit in fixed intervals it is possible to estimate the heat generating and/or passive components 8 or the different parts in the heat generating and/or passive component durability or life.

One way of doing this, is by use of the Coffin-Manson model, which was developed to predict low cycle fatigue failures in metals. The model allows the number of cycles to failure in accelerated laboratory tests to be correlated with the heat generating and/or passive components 8 in use in a wind turbine 1, so that the expected time to failure of the heat generating and/or passive components 8 or the parts of which they consist can be estimated.

The Coffin-Manson model is as follows:

$$\frac{N_{use}}{N_{test}} = \left(\frac{\Delta T_{test}}{\Delta T_{use}}\right)^m$$

Where $\Delta T_{test}$ and $\Delta T_{use}$ are the peak-to-peak temperature excursions of the heat generating and/or passive components 8 or component parts in the laboratory and in use in the field, respectively; and $N_{test}$ and $N_{use}$ are the corresponding number of cycles to failure in the laboratory and in use in an operating wind turbine 1.

m is a constant, typical value for a given failure mechanism or it is derived from empirical data. E.g. the m value for solder is approximately 2.

If the peak-to-peak temperature excursion and cyclic frequency associated with a heat generating and/or passive component is known, and there is a target reliability during the service life, the Coffin-Manson model can be used to define the minimum acceptable number of cycles to failure in an accelerated qualification test.

This means that if $\Delta T_{use}$, $N_{test}$ and $N_{use}$ is known, it is possible, within a reasonable margin of error, to predict the life of the heat generating and/or passive components 8 or the parts in the heat generating and/or passive components, making it possible and economically advantageous to exchange heat generating and/or passive components 8 or parts of the heat generating and/or passive components as part of the regular service of the wind turbines 1.

An effect of this control of the lowering of the components 8 temperature and thereby the possibility of estimating the life of the components 8 is, that it is possible to foresee the consequences of a deliberate overproduction. This could e.g. be if a wind turbine 1 was used for compensating for peaks in the general power consumption. This could mean that over a period of time, the wind turbine 1 was set to produce more power than it was actually designed for, making the components 8 temperature rise. This could lead to an overall reduction in some or all of the components 8 life, but due to the controlled cooling down procedure it is still possible to predict the components 8 life, making the system very reliable.

Figure 7:
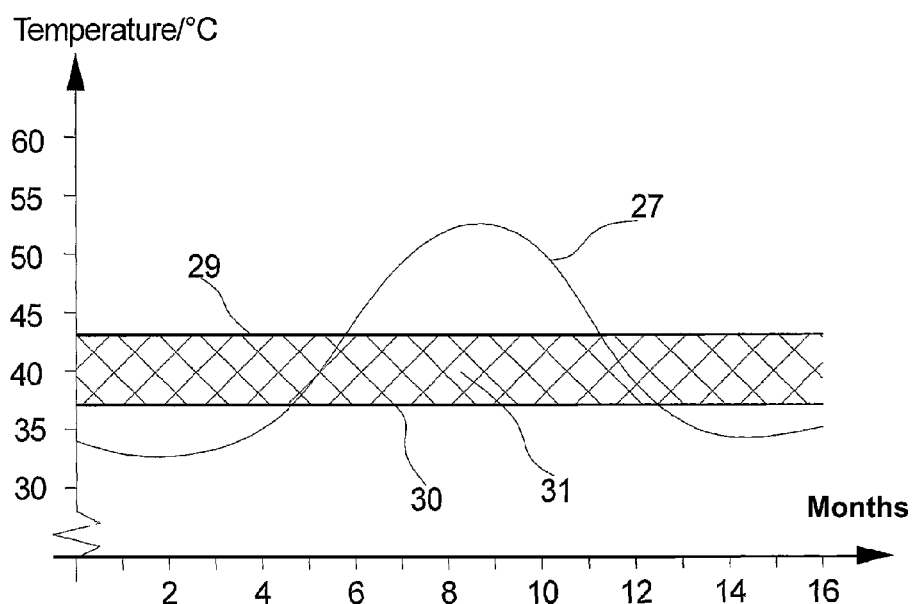
FIG. 7 illustrates an embodiment of heat generating and/or passive components temperature curves as seen over sixteen months.

FIG. 7 illustrates an embodiment of a heat generating and/or passive components 8 temperature curve 27 as seen over sixteen months. As the solid curve illustrates, the temperature of the heat generating and/or passive components 8 follows the general seasonal changes in the temperature. The curve 27 further illustrates that the average temperature of a heat generating and/or passive component 8 varies over time making it follow the ambient temperature and the wind load on the wind turbine 1.

The hatched area 31 substantially illustrates the area 31 wherein the component 8 temperature in a traditional temperature control system 26 fluctuates. This fluctuation area 31 is limited by an upper temperature level 29 and a lower temperature level 30.

The invention has been exemplified above with reference to specific examples of temperature control systems 26 for heat generating and/or passive components 8 of a wind turbine 1. However, it should be understood that the invention is not limited to the particular examples described above but may be designed and altered in a multitude of varieties within the scope of the invention as specified in the claims.

What is claimed is:

1. A method for prolonging and/or controlling the life of one or more heat generating and/or passive components in a wind turbine, said method comprising the steps of:
   detecting a temperature peak in said one or more heat generating and/or passive components;
   activating a controlled cooling of the one or more heat generating and/or passive components after the detection of the peak; and
   wherein the controlled cooling lowers the temperature of the one or more heat generating and/or passive components by a predetermined amount over a predetermined time based on the temperature peak.

2. The method according to claim 1, wherein said temperature of said one or more heat generating and/or passive components, is controlled according to a predefined reference curve.

3. The method according to claim 1, wherein said temperature of said one or more heat generating and/or passive components, is controlled according to a linear or substantially linear reference curve.

4. The method according to claim 1, wherein said temperature of said one or more heat generating and/or passive components, is controlled by lowering said temperature of said one or more of said heat generating and/or passive components in steps.

5. The method according to claim 1, wherein said temperature of said one or more heat generating and/or passive components, is controlled by lowering said temperature of said one or more heat generating and/or passive components until a predefined lowest operational temperature is reached.

6. The method according to claim 1, wherein said temperature of said one or more heat generating and/or passive components, is controlled by lowering said temperature until said temperature rises and a new temperature peak occurs.

7. The method according to claim 1, wherein said temperature of said one or more heat generating and/or passive components, is controlled by lowering said temperature of said one or more heat generating and/or passive components averagely 1° C. between every 10 minutes to 1440 minutes.

8. The method according to claim 1, wherein said temperature of said one or more heat generating and/or passive components, is controlled by controlling the temperature of the air in and/or surrounding one or more of said heat generating and/or passive components and/or controlling the temperature of a fluid mean for internal temperature control of one or more of said heat generating and/or passive components.

9. The method according to claim 1, wherein said temperature of said one or more heat generating and/or passive components, is controlled by means at least one refrigerant.

10. The method according to claim 1, wherein said heating and cooling means comprise means for heating or cooling said refrigerant.

11. The method according to claim 1, wherein said heat generating and/or passive components are power handling equipment and/or mechanical components.

12. The method according to claim 1, wherein said method further includes the step of lowering said temperature of said one or more of said heat generating and/or passive components controlled from said peak temperature.

13. The method according to claim 1, wherein said method further includes the step of positioning said means for controlling the temperature of the air in and/or surrounding one or more of said heat generating and/or passive components inside said heat generating and/or passive components.

14. The method according to claim 1, wherein said method further includes the step of controlling the temperature of said means for controlling the temperature, of the air in and/or surrounding one or more of said heat generating and/or passive components, by means of said refrigerant.

15. The method according claim 1, wherein said temperature of said one or more heat generating and/or passive components, is controlled by varying the output of said heating and cooling means.

16. The method according to claim 1, wherein said temperature of said one or more heat generating and/or passive components, is controlled by turning said heating and cooling means on and off.

17. The method according to claim 1, wherein said method further comprises estimating the life of said components by use of one or more fatigue life prediction models.

18. A wind turbine comprising means for prolonging and/or controlling the life of one or more heat generating and/or passive components, wherein said means comprise,
one or more temperature control systems including heating and cooling means,
means for detecting a temperature peak in said one or more heat generating and/or passive components;
means for activating a controlled cooling of said one ore more heat generating and/or passive components; and
wherein the means for activating the controlled cooling lowers the temperature of the one ore more heat generating and/or passive components by a predetermined amount over a predetermined time based on the temperature peak.

19. The wind turbine according to claim 18, wherein said means lowers the temperature of said one or more heat generating and/or passive components, according to a predefined reference curve.

20. The wind turbine according to claim 19, wherein said predefined reference curve provides for substantially linearly lowering of said temperature.

21. The wind turbine according to claim 19, wherein said predefined reference curve provides for lowering of said temperature in steps.

22. The wind turbine according to claim 18, wherein said means lowers the temperature of said one or more heat generating and/or passive components until a predefined lowest operational temperature is reached or until said temperature rises and a new temperature peak occurs.

23. The wind turbine according to claim 18, wherein said means lowers the temperature of said one or more heat generating and/or passive components averagely 1° C. between every 10 minutes to 1440 minutes.

24. The wind turbine according to claim 18, wherein said means further comprise at least one refrigerant.

25. The wind turbine according to claim 18, wherein said heating and cooling means comprise means for heating or cooling said refrigerant.

26. The wind turbine according to claim 18, wherein said heat generating and/or passive components are power handling equipment and/or mechanical components.

27. The wind turbine according to claim 18, wherein said means lowers the temperature of said one or more heat generating and/or passive components controlled from said peak temperature.

28. The wind turbine according to claim 18, wherein said means controls the temperature of said one or more heat generating and/or passive components by varying the output of said heating and cooling means.

29. The wind turbine according to claim 18, wherein said means controls the temperature of said one or more heat generating and/or passive components by turning said heating and cooling means on and off.

30. The wind turbine according to claim 18, wherein said means comprise means for controlling the temperature of the air in and/or surrounding one or more of said heat generating and/or passive components and/or fluid means for internal temperature control of one or more of said heat generating and/or passive components.

31. The wind turbine according to claim 30, wherein said means for controlling the temperature of the air in and/or surrounding one or more of said heat generating and/or passive components are positioned inside said heat generating and/or passive components.

32. The wind turbine according to claim 18, wherein said means controls the temperature of said means for controlling the temperature, of the air in and/or surrounding one or more of said heat generating and/or passive components, by means of a refrigerant.

33. The wind turbine according to claim 18, wherein said wind turbine is a variable speed pitch controlled wind turbine.

* * * * *